UNITED STATES PATENT OFFICE.

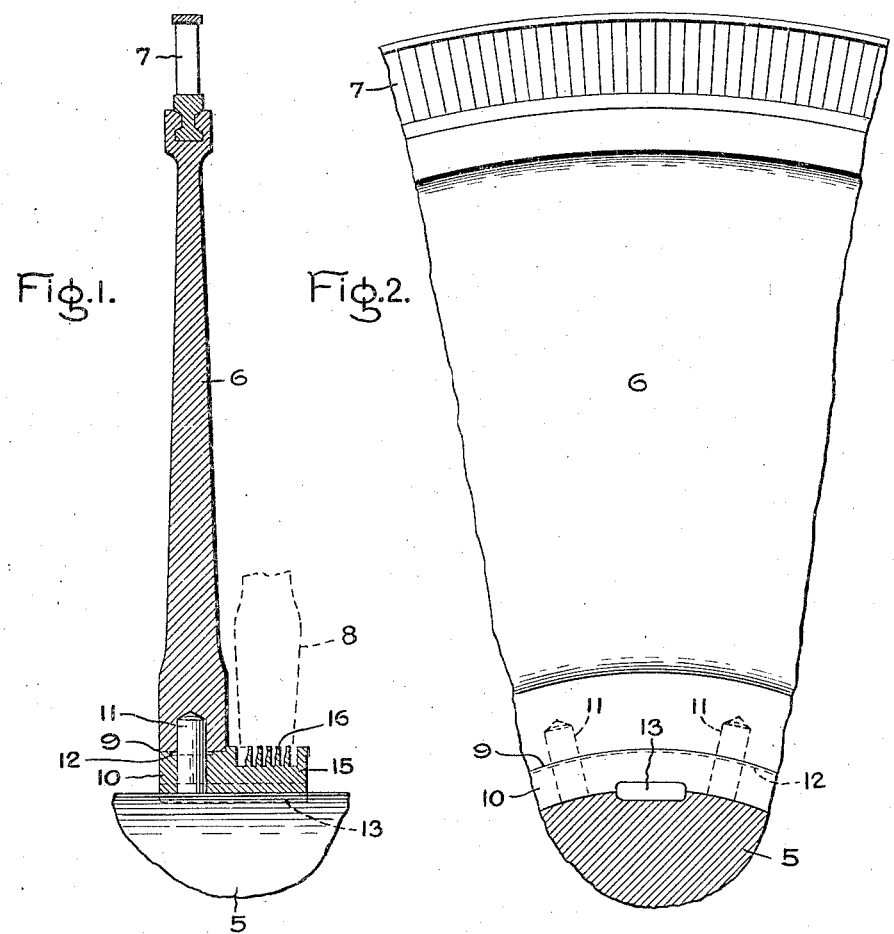

OSCAR JUNGGREN, OF SCHENECTADY, NEW YORK, ASSIGNOR TO GENERAL ELECTRIC COMPANY, A CORPORATION OF NEW YORK.

ELASTIC-FLUID TURBINE.

1,362,323.   Specification of Letters Patent.   Patented Dec. 14, 1920.

Application filed April 28, 1920. Serial No. 377,376.

*To all whom it may concern:*

Be it known that I, OSCAR JUNGGREN, a citizen of the United States, residing at Schenectady, county of Schenectady, State of New York, have invented certain new and useful Improvements in Elastic-Fluid Turbines, of which the following is a specification.

The present invention relates to elastic-fluid turbines and particularly to turbines of the type comprising a plurality of disks or wheels mounted on the shaft and carrying suitable buckets upon the periphery. With such turbines it is important that the disks or wheels be made as light as possible in order to reduce the weight of the machine thereby reducing its size. In addition, by making the disks or wheels as thin as possible, particularly at the hubs where the greatest stresses occur, the distance between the bearings may be reduced, or a larger number of stages may be put in in the same distance. On the other hand, it is essential to obtain a rigid construction which will withstand not only the stresses set up due to centrifugal action but also those which occur due to the substantial temperature changes which are continuously going on in the turbine due to changes in load and variations in the vacuum. If the turbine wheel or disk is rigidly fastened to the shaft these latter strains, due to temperature changes, are very large, particularly in the hubs, on account of the wheels or disks responding much more quickly to temperature changes than the heavy shaft, and with this arrangement, relatively heavy wheels, having strong hubs are required as otherwise the wheels, if made too thin and light, will distort and possibly loosen on the shaft.

In this connection, it has already been proposed to fasten or connect a wheel to the shaft in such manner that it is free to respond to temperature changes independently of the shaft, whereby strains due to temperature changes are practically eliminated which permits of the wheel or disk being made much lighter and thinner than before, and the object of my present invention is to provide an improved structure and arrangement in a fastening or connecting means of this character.

In the drawing, Figure 1 is a radial, sectional view of a part of the turbine wheel fastened to the shaft in accordance with my invention, and Fig. 2 is a side elevation of a part of the wheel shown in Fig. 1.

Referring to the drawing, 5 indicates a shaft and 6 a turbine wheel mounted thereon and carrying the usual ring or rings of buckets 7. Only a single wheel is shown in the drawing but it will be understood that a complete turbine comprises a number of such wheels spaced along the shaft with diaphragms between them, which diaphragms divide the turbine into stages and contain nozzles for directing the elastic fluid from the buckets of one stage to the buckets of the next stage. In Fig. 1 a diaphragm is indicated in dotted lines at 8.

According to my invention, I provide the wheel or disk 6 with a central opening 9 of greater diameter than the shaft and in this opening is a ring 10 of an outside diameter to just fit opening 9. Ring 10 may be fastened to wheel 6 in any suitable manner for transmitting torque from the wheel to the ring, but preferably I employ a number of radially extending dowel pins 11, for example eight, which dowel pins extend through openings in ring 10 and enter recesses in the bore of wheel 6. In order to minimize or retard the transfer of heat from wheel 6 to ring 10, I so construct the wheel and ring that they are in engagement with each other over a limited area only and not throughout the entire thickness of the wheel. To this end, I may provide an annular groove in either the bore of the wheel, the outer surface of ring 10, or both so that they engage each other over a limited area only. In the present instance, I have shown ring 10 as provided with an annular groove 12 in its peripheral surface so that the ring and wheel are in engagement with each other along the edges of the wheel only. The wheel 6 with the ring 10 attached thereto is shrunk on shaft 5 in the usual manner, the ring being keyed to the shaft by a suitable key or keys as indicated at 13. With this arrangement it will be noted that the ring 10 engages the shaft 5 over its entire area, so that heat may be transferred rapidly from ring 10 to shaft 5. On the other hand, wheel 6 engages ring 10 over a limited area only so that the transfer of heat from wheel 6 to ring 10 will be retarded.

With the foregoing arrangement, when temperature changes take place such as occur, for example, in starting up the machine, which changes cause the wheel or disk 6 to heat up more quickly than the heavy shaft 5, such wheel or disk may expand independently of the shaft moving slightly away from ring 10. The wheel will, however, be guided by dowel pins 11 which will keep it centered and transmit the torque from it to the shaft. Since the bore of wheel 6 engages ring 10 over a limited area only, the transfer of heat from wheel 6 to ring 10 will be relatively slow and will not be sufficiently fast to cause ring 10 to heat up and expand away from the shaft, this being due to the fact that such heat as is transferred to ring 10 from wheel 6 can be transferred from ring 10 to shaft 5 at a rate sufficiently rapid as to prevent ring 10 from heating up materially faster than shaft 5, this being due to the large area of ring 10 which is in engagement with shaft 5.

In connection with elastic-fluid turbines of this type, it is desirable to provide a suitable packing to prevent leakage between the bore of the diaphragm and the shaft, and in order to still more rapidly increase the transfer of heat from ring 10 to shaft 5 I may form an extension 15 on either one or both sides of ring 10, which extension projects under the adjacent diaphragm or diaphragms and carries packing teeth 16 which pack against the bore of the diaphragm. With this arrangement such heat as is transferred from wheel 6 to ring 10 will be still more quickly transferred to shaft 5 owing to the larger area in engagement therewith.

As will be clear from a consideration of the foregoing, I provide a ring through which a turbine wheel is connected to a shaft, and so arrange it that the area of the ring surface in contact with the wheel is a minimum so as to make the transfer of heat from the wheel to the ring as small as possible while the area of the ring surface in engagement with the shaft is a maximum so as to make the transfer of heat from the ring to the shaft as great as possible. This prevents the ring from heating up materially faster than the shaft and becoming loose thereon.

In accordance with the provisions of the patent statutes, I have described the principle of operation of my invention, together with the apparatus which I now consider to represent the best embodiment thereof, but I desire to have it understood that the apparatus shown is only illustrative, and that the invention may be carried out by other means.

What I claim as new and desire to secure by Letters Patent of the United States, is,—

1. In combination, a shaft, a wheel having a bore of greater diameter than the shaft, a ring which fits the bore of the wheel and is interposed between the wheel and the shaft, said ring having an annular groove in its outer surface whereby the wheel engages the ring over a limited area only, and dowel pins fastening the ring to the wheel.

2. In combination, a shaft, a wheel having a bore of greater diameter than the shaft, a ring which fits the bore of the wheel and is interposed between the wheel and the shaft, said ring and wheel engaging each other over a limited area only whereby the transfer of heat from the wheel to the ring is retarded, and means connecting the ring to the wheel for transmitting torque from one to the other.

3. In an elastic-fluid turbine comprising a shaft and a rotor member having buckets thereon, means for fastening the rotor member to the shaft comprising a ring member shrunk on the shaft and interposed between the rotor member and the shaft, one of said members being provided with an annular groove whereby they engage each other over a limited area only, and radially extending parts which connect said members to transmit torque between them.

4. In an elastic-fluid turbine comprising a shaft and a rotor member having buckets thereon, means for fastening the rotor member to the shaft comprising a ring member shrunk on the shaft and interposed between the rotor member and the shaft, one of said members being provided with an annular groove whereby they engage each other over a limited area only, radially extending parts which connect said members to transmit torque between them, and an extension forming an integral part of said ring member which projects beyond the wheel so as to increase the transfer of heat from the ring member to the shaft.

5. In an elastic-fluid turbine comprising a shaft and a rotor member having buckets thereon, means for fastening the rotor member to the shaft comprising a ring member shrunk on the shaft and interposed between the rotor member and the shaft, one of said members being provided with an annular groove whereby they engage each other over a limited area only, radially extending parts which connect said members to transmit torque between them, an extension forming an integral part of said ring member which projects beyond the wheel so as to increase the transfer of heat from the ring member to the shaft, and packing means carried by said extension.

6. In combination, a shaft, a wheel having a bore of greater diameter than the shaft, a ring which fits the bore of the wheel and is interposed between the wheel and the shaft, said ring having a portion extending beyond the wheel and having a shrink fit with the shaft throughout its axial length so as to increase the transfer of heat from the ring to the shaft, and packing means carried by said extension.

7. In combination, a shaft, a wheel, and a ring interposed in the bore of the wheel between the wheel and shaft and having a shrink fit with the shaft throughout its axial length, said ring having a greater surface in contact with the shaft than with the wheel whereby heat will be more rapidly transferred between the ring and shaft than between the ring and wheel.

In witness whereof, I have hereunto set my hand this 27th day of April, 1920.

OSCAR JUNGGREN.